(12) United States Patent
Lee

(10) Patent No.: US 6,659,245 B1
(45) Date of Patent: Dec. 9, 2003

(54) ONE WHEEL BRAKE SYSTEM OF AUTOMOBILE

(76) Inventor: Byung-Kug Lee, 103-1312, Woobang Apt., Maekog-lee, Tasa-up, Talsung-koon, Taegu-shi 711-810 (KR)

( * ) Notice: Subject to any disclaimer, the term of this patent is extended or adjusted under 35 U.S.C. 154(b) by 2 days.

(21) Appl. No.: 10/030,905

(22) PCT Filed: Jul. 11, 2000

(86) PCT No.: PCT/KR00/00745

§ 371 (c)(1),
(2), (4) Date: Jan. 14, 2002

(87) PCT Pub. No.: WO01/03985

PCT Pub. Date: Jan. 18, 2001

(30) Foreign Application Priority Data

Jul. 13, 1999 (KR) ........................ 1999-29206

(51) Int. Cl.[7] ................................................ B60T 11/00
(52) U.S. Cl. ................................. 188/354; 303/114.3
(58) Field of Search ................... 303/191, 192, 303/159, 146, 163, 113.1, 115.2, 119.2, 114.3, 113.3; 188/354, 181 A, 181 C, 182

(56) References Cited

U.S. PATENT DOCUMENTS

| | | | | |
|---|---|---|---|---|
| 3,667,813 A | * | 6/1972 | Bruckhardt et al. | .... 188/181 C |
| 3,698,772 A | * | 10/1972 | Nixon | .................. 188/181 A |
| 3,756,663 A | * | 9/1973 | Fink et al. | ................... 303/159 |
| 5,000,521 A | * | 3/1991 | Majima et al. | ............. 303/146 |
| 5,215,358 A | * | 6/1993 | Beilfuss et al. | .......... 303/114.3 |
| 6,209,968 B1 | * | 4/2001 | Bayens et al. | ........... 303/114.3 |

\* cited by examiner

Primary Examiner—Jack Lavinder
Assistant Examiner—Melanie Torres
(74) Attorney, Agent, or Firm—Smith Patent Office

(57) ABSTRACT

This is a new brake system for minimizing the turning radius of a vehicle when it makes a U-turn or parks. The minimum turning radius of a conventional vehicle has a certain limit because a conventional vehicle takes the Ackerman-Jeantaud steering principle. The object of this invention is to overcome the limit of the minimum turning radius by introducing the new concept, the one wheel brake system. This invention utilizes the phenomenon that if one wheel is braked, the other wheel is driven by the differential gear. Hence the vehicle circles around a braked wheel as its pivot. So it turns much smaller than the minimum turning radius of the Ackerman-Jeantaud steering angle.

13 Claims, 6 Drawing Sheets

FIG. 3 - (I)
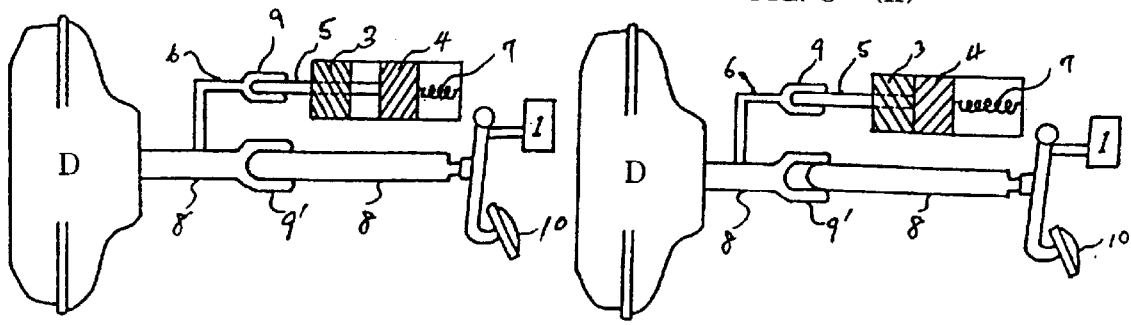
FIG. 3 - (II)
FIG. 3 - (III)
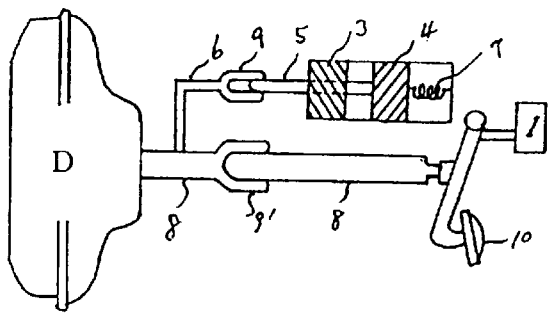
FIG. 4 - (I)
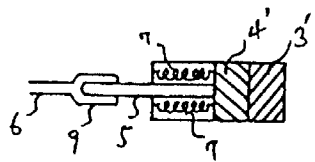
FIG. 4 - (II)
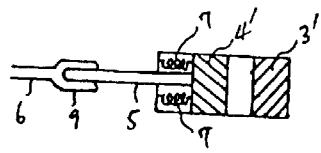
FIG. 5 - (I)
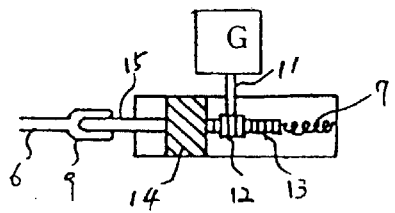
FIG. 5 - (II)
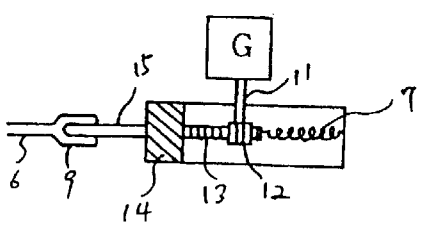

FIG. 6 - (I)
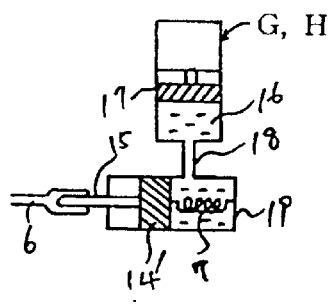
FIG. 6 - (II)
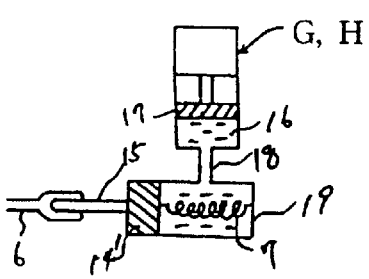
FIG. 7 - (I)
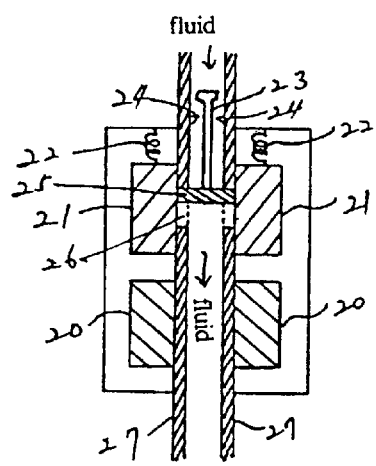
FIG. 7 - (II)
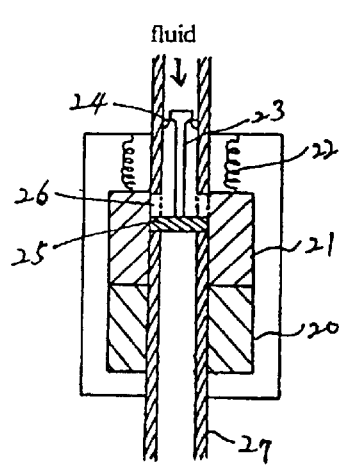
FIG. 8 - (I)
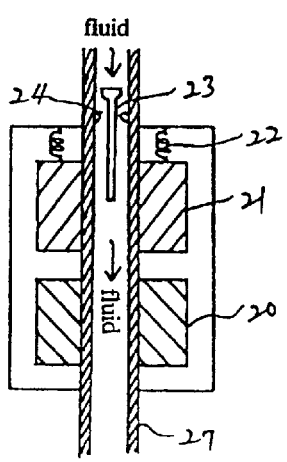
FIG. 8 - (II)
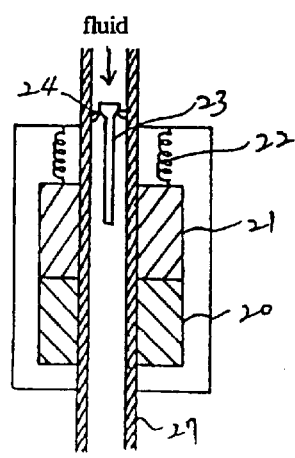

FIG. 9 - (I)
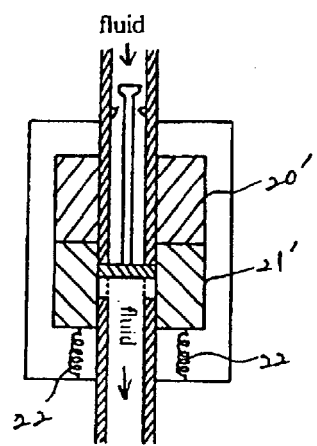
FIG. 9 - (II)
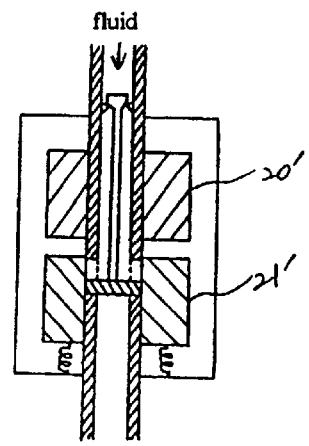
FIG. 10 - (I)
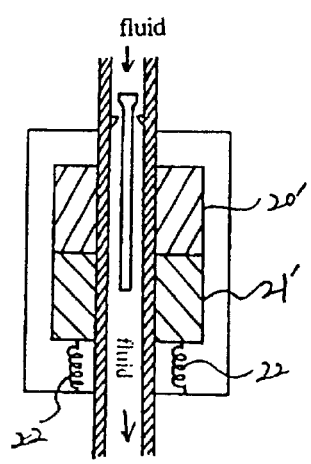
FIG. 10 - (II)
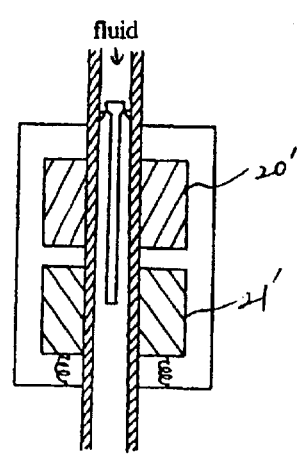
FIG. 11 - (I)
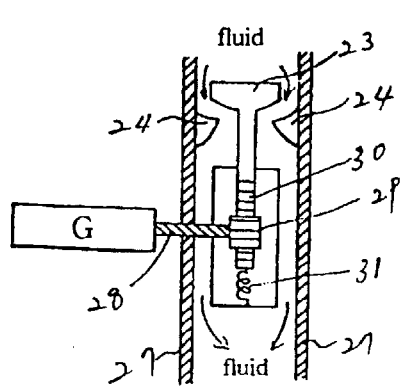
FIG. 11 - (II)
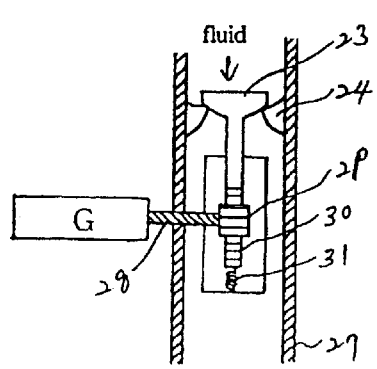

FIG. 12 -(I)
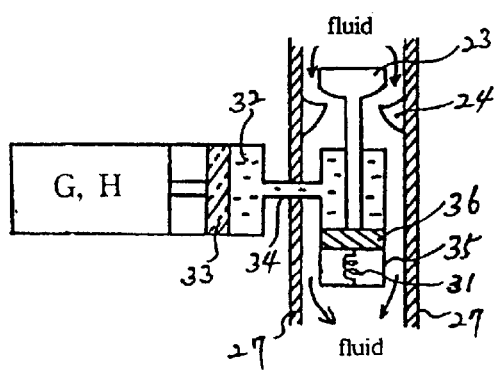
FIG. 12 -(II)
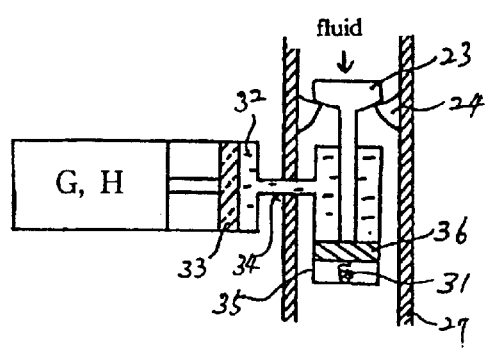
FIG. 13 -(I)
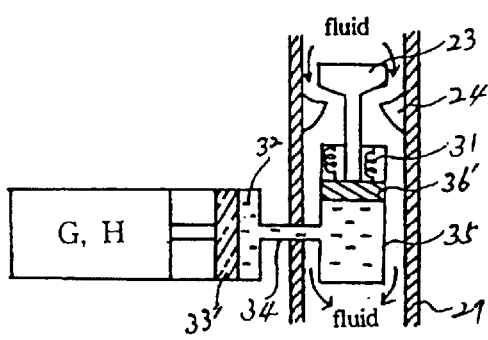
FIG. 13 -(II)
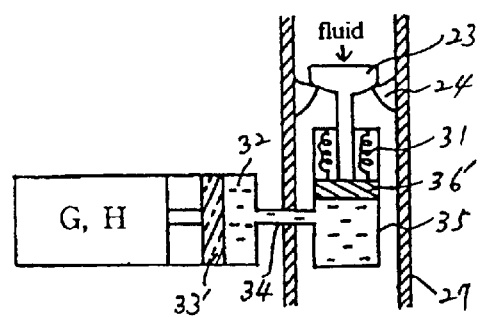
FIG. 14
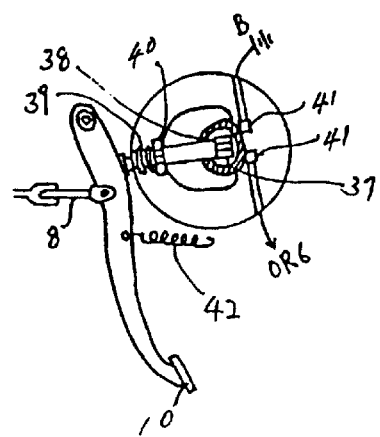
FIG. 15
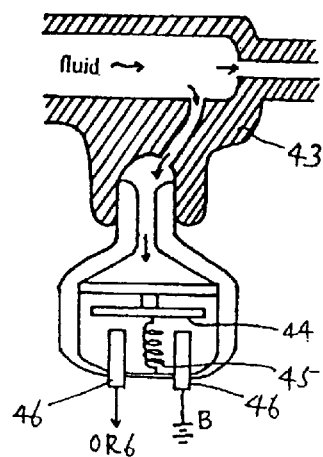

FIG. 16
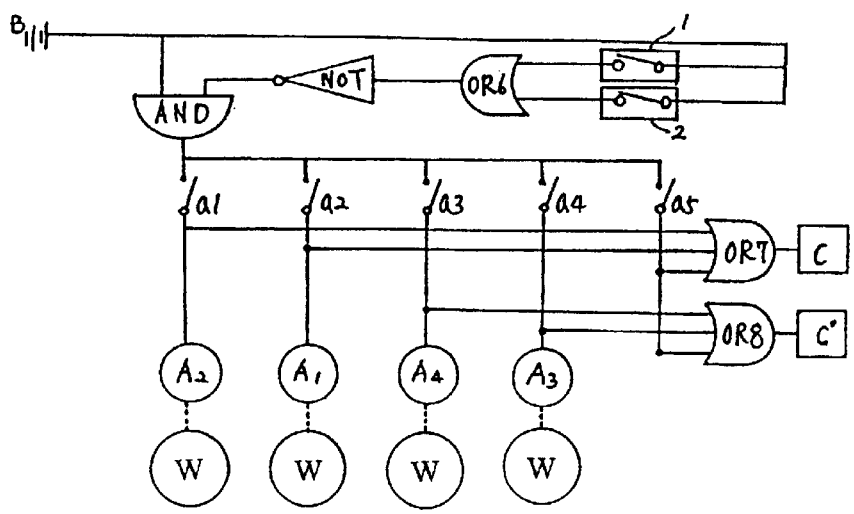
FIG. 17 - (I)
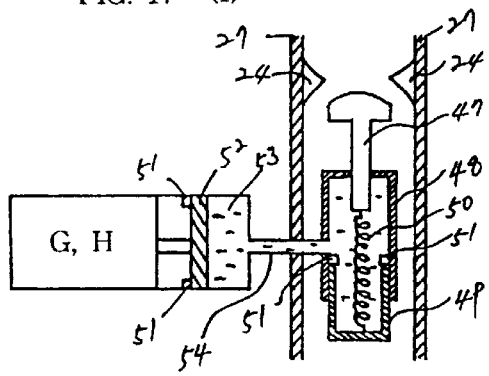
FIG. 17 - (II)
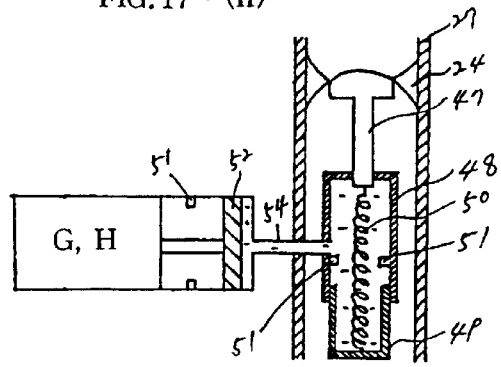
FIG. 18
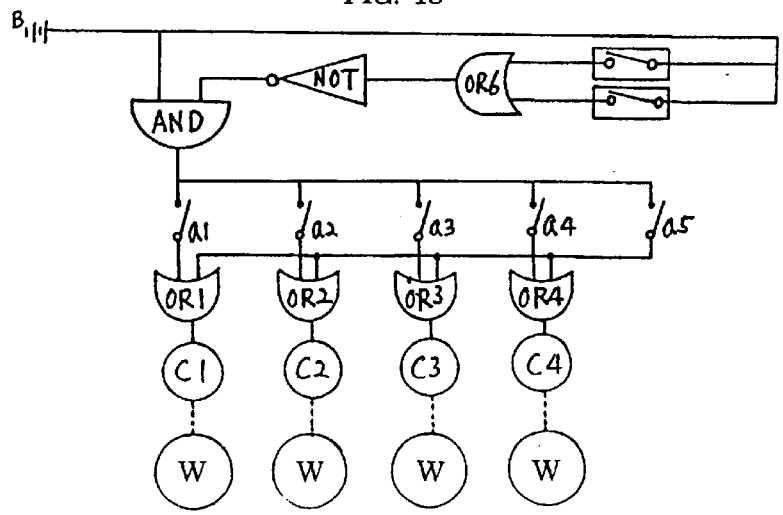

ONE WHEEL BRAKE SYSTEM OF AUTOMOBILE

TECHNICAL FIELD

This is a new brake system for minimizing the turning radius of a vehicle when it makes a U-turn or parks. Its object is to overcome the limit of conventional vehicles' minimum radii through its circling around one of its wheels which isn't braked. It is a totally new concept.

BACKGROUND ART

Typical vehicles' systems have adopted the Ackerman-Jeantaud steering principle. This principle lets a car circle around a point at a certain distance from it. But this invention make it circle around the wheel by utilizing the phenomenon that if one of its wheels is braked, an differential gear apparatus works, and motive power is sent to other wheels that are less loaded, that is, not braked, and therefore it can circle within a shorter radius than others can.

The traditional system just concentrates on how to stop shortly and steadily so it's equipped with a booster and an anti-lock brake system. This is a completely different auxiliary brake system from others which are operated with electric power. As stated above, this is a brake system; however, its ultimate aim is not to improve the ability of braking but to minimize its turning radius by braking one wheel.

DISCLOSURE OF INVENTION

The brake is to restrict the driving force of wheels ultimately. If the brake is put on, the increased power in the booster is transferred to the master cylinder, which generates high hydraulic pressure. This pressure pushes the pistons of each wheel cylinders and a caliper cylinders, pressures brake shoes and a discs and makes brake drums or pads compressed to provide the car with braking power by friction via brake lines.

This system is largely composed of three kinds of principles. First, it makes the braking power by utilizing a actuator installed between a brake pedal and a booster. Second, it transfers the hydraulic pressure to its aim, a brake line exclusively. Third, this is a circuit apparatus for an one wheel brake and safety. Motive power of the actuator and hydraulic pressure cutoff devices can adopt anything among the method that uses attraction or repulsion of electromagnets with electric power stored in battery, the method that moves pinion connected to armature of electromotor, or the hydraulically-operated method that inject it with oil. Choosing one of these methods depends on the efficiency changed according to the structure of vehicles or the convenience in manufacturing it, and this invention suggests the basis for this theory here.

Minimizing the radius creates several merits. First, there is the considerable convenience of parking or pulling out of narrow spaces. Therefore, this invention is very useful for a beginner or a driver afraid of parking. Second, it is easy to park the car in narrow places between other cars. These usually needs to be 1.5 time space as the length of vehicles to park in an I-formed place, however parking a car with this apparatus, just 1.2 time space as that of vehicles is required. Hence, it allows many more cars to park on the limited spaces in cites. Third, it ameliorates the ability of a U-turn. Minimizing the radius to an extreme means that it makes a U-turn faster or more convenient. Forth, its additional benefits elevates vehicles' capacity for getting out of a rugged or swampy spot by concentrating motive power on the free wheels. Fifth, it can ensure that braking power stronger than the hand brake eliminating an operator's troublesome pull when the vehicle stands on a slope or waits for a green light. This function increases the convenience of driving and the transmission of an auto-transmission vehicle fitted for being loaded as much as possible at a fixed amount. As stated above, this system has a lot of strong points but this applied invention of mine(application No. 98-39533 KR) has drawbacks, which includes the increase of the vehicle weight due to equipping it with an independent auxiliary brake system, the necessity of strong power for generating high hydraulic pressure, and the difficulty in manufacturing it due to the complication of its structure. However, this invention has solved these shortcomings through another method. The previous problems are removed by the attachment of this one brake system to the foot brake line of the vehicle keeping its original function intact. It gets rid of the possibility of accidents caused by misoperation of a dashboard during an operator's driving.

BRIEF DESCRIPTION OF DRAWINGS

FIG. 3-(I) is a structural view of the actuator(attraction type). (II)is a view of working. (III) is a structural view of the actuator when a operator presses the brake pedal;

FIG. 4-(I) is a structural view of the actuator(repulsion type). (II)is a view of working;

FIG. 5-(I) is a structural view of the actuator(electromotor type). (II)is a view of working;

FIG. 6-(I) is a structural view of the actuator(hydraulic pressure type). (II)is a view of working;

FIG. 7-(I) is a front section view of the hydraulic pressure cutoff device (attraction type). (II) is a view of working;

FIG. 8-(I) is a side section view of the hydraulic pressure cutoff device (attraction type). (II) is a view of working;

FIG. 9-(I) is a front section view of the hydraulic pressure cutoff device (repulsion type). (II) is a view of working;

FIG. 10-(I) is a side section view of the hydraulic pressure cutoff device (repulsion type). (II) is a view of working;

FIG. 11-(I) is a structural view of the hydraulic pressure cutoff device (electromotor type). (II) is a view of working;

FIG. 12-(I) is a structural section view of the hydraulic pressure cutoff device (fluid injection type). (II) is a view of working;

FIG. 13-(I) is a structural section view of the hydraulic pressure cutoff device (fluid inhalation type). (II) is a view of working;

FIG. 14 is a structural view of the brake switch contact point(snap type) of a vehicle with a automatic transmission;

FIG. 15 is a structural view of the brake switch contact point (hydraulic pressure type) of a vehicle with a automatic transmission;

FIG. 16 is a view of the electric circuit when the actuators are equipped with the fluid discharge pipe of the master cylinder;

FIG. 17 is a structural view of the actuator when the actuators are equipped with the fluid discharge pipes of the master cylinder; and FIG. 18 is a view of the electric circuit when the individual brake line is equipped with an actuator.

BEST MODE FOR CARRYING OUT THE INVENTION

Figure 1:
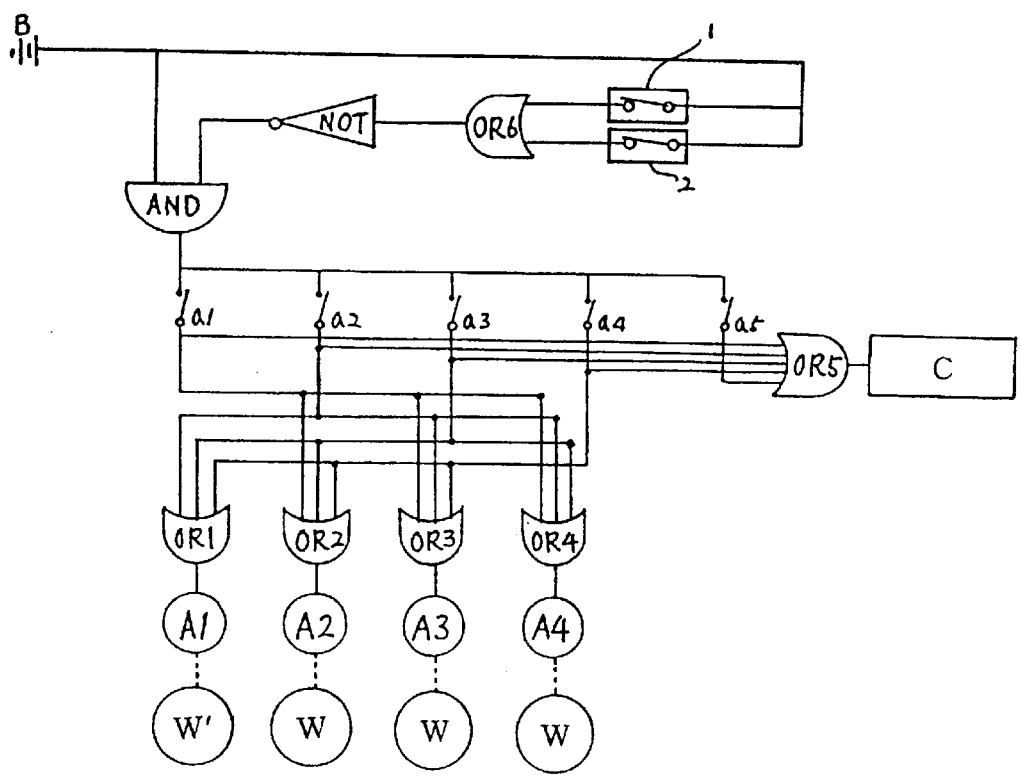
FIG. 1 is a view of the electric circuit of the present invention.

First, an electric circuit is required, as shown in FIG. 1. The operator can control it through a switch for opting for braking one or all wheels in need. As shown in FIG. 1, an operator can brake on a certain one(w') among four wheels by turning on the switch for one of the fixed contact points(a1~a4) when he wants to brake it. the one-sided output power connected to battery(B) is sent to the AND gate(AND) on condition of high, and the other-sided output power is connected to and the stop lamp contact point(1) and it is connected to the speed sensor contact point(2) and the contact point(in case of auto-transmission, vehicle, it will be explained later) that supply at the moment when the stop light is on and if it exceeds a certain speed(established speed about 20 Km/h) to sent power(omitting the drawing of the circuit) which includes the contact point that turns on power to OR gate(OR6) arranging in a row. Therefore, because both powers supplied to OR gate(OR6) become low all, on condition that its brake pedal is not pressed and the vehicle's speed is less than a certain speed(established speed about 20 Km/h), power of low is allowed. If power of low is supplied to the invertor(NOT), the invertor(NOT) allowed output of high, and because both powers are high, output of high is allowed by AND gate. power of high from AND gate supplies electricity the fixed contact point(a1~a5) selected by a operator.

One of the power source through the fixed contact point supplies electric power to OR gate(OR5), and it operates the actuator(C). Another power source through one of the fixed contact points(a1~a4) supplies electricity to the circuit selected by the operator. If the power source is supplied through fixed point a1, all hydraulic pressure cut off devices (A2~A4) gets. electricity except hydraulic pressure cut off device A1, and consequently only the wheel(W') connected to hydraulic pressure cut off device A1 is activated and one wheel is braked. Similarly, if electricity is supplied through a2, it is transmitted to all hydraulic pressure cut off devices (A1~A4) except A2, if through a3, electricity is transmitted to all(A1~A4) except A3, and if through a4, then it is transmitted to all(A1~A3) except A4. Electricity activates the hydraulic pressure cut off device and starts the wheel chosen by the operator.

Figure 2:
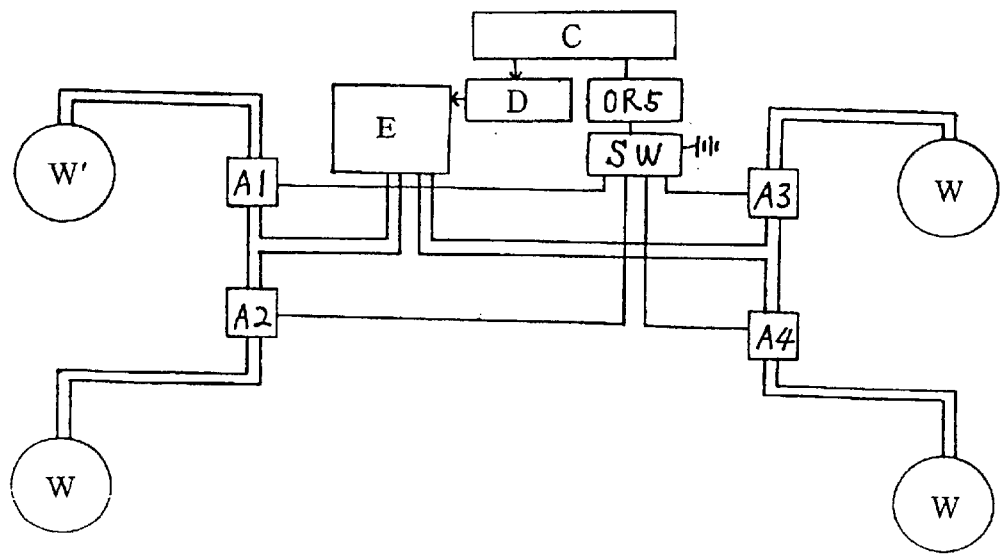
FIG. 2 is a view of the summary composition.

The operation of the one wheel brake system can be explained by referring to FIGS. 1 and 2. As an operator selects a switch(e.g.:a1) to brake a wheel, electricity is supplied to activate the actuator(C) through OR5. The actuator(C) pushes the push rod connected to the booster and the increased power in the booster reaches the master cylinder(E) creating high hydraulic pressure needed for full brake. The high hydraulic pressure created in the master cylinder is then transmitted to each brake lines. At this time, the hydraulic pressure cut off device operating by another power source cuts off the hydraulic pressure reaching all hydraulic pressure cut off devices(A2~A4) except to A1. As a result all the hydraulic pressure created through the master cylinder is sent to only A1's brake line, and brakes the wheel(W') of A1's brake line as intended. After the achievement of one wheel braking object, as a rule the operator presses the brake pedal in order to stop the vehicle. As operator presses the brake pedal, the stop lamp contact point is turned on, and OR6, connected to the stop lamp contact point(1), allows high for the invertor(NOT). However, the invertor refuses high electricity and allows low for the AND gate(AND). The AND gate doesn't supply electric power to the actuator(C) and allows low because one of its power source is at low. The actuator stops its work as it receives no electricity and returns to its idle state, the hydraulic pressure cutoff devices(A2~A4) also stop their functions, and the foot brake line pressed by the operator begins to work and stops the automobile. When the operator turns the fixed contact point's switch off, the one wheel brake system is shut down. Furthermore, the reason why the power source of OR6 is connected with speed sensor contact point(2) is to prevent the possibility of accident by the malfunction of the one wheel brake system or by the operator's mistake during high speed. When the speed of the vehicle exceeds the elected speed(established speed about 20 Km/h), the speed sensor circuit is turned on and electricity is passed through the speed sensor contact point allowing high. The operating mechanism after high is allowed is identical to the one of pressing the brake pedal. The reason that equips the fixed contact point a5 is to supply electric power to only the actuator(C) without the operator's troublesome labor to pull the hand brake when the vehicle stands on slope or waits for a green light. In this case, only the actuator is operating with all electric power cut off from the hydraulic pressure cutoff devices, which results in high hydraulic power supplied to all brake lines. The vehicle is completely braked as when the brake pedal is fully pressed. In this situation, automatic transmission vehicles need not shift the gear to N because the vehicles are fully braked on gear D. Removing the brake is as is explained above.

Next the structure and the operating of the actuator after electricity is supplied will be illustrated. FIG. 3-(I) is the basic structural view of the actuator before working, (II) the view of the actuator in full motion, and (III) the view of the actuator when the operator press the brake pedal. The actuator(C) is basically composed of the driving electromagnet(4) which is produced when the supplied electric power becomes magnets, the fixed electromagnet (3), the electromagnet shaft(5) which pushes the push rod connecting shaft(6), the return spring(7) which restores the driving electromagnet after the electric power is cut off, and the uneven groove(9) which links the push rod connecting shaft and the electromagnet shaft. The form of the uneven groove has to be removable, so it should be in the shape of a hook, or whatever form which can push the push rod connecting shaft(6) while the actuator is operating and be easily separated when the actuator is turned off. The reason why the form has to be such as the push rod connecting shaft(6) and the electromagnet shaft(5) are easily separated is to prevent the operator's pressing power doubling while normally trying to brake the vehicle, which occurs when the push rod connecting shaft and the electromagnet shaft are fixed. In addition, the push rod(8) connected to the brake pedal should also be in the form of removable uneven groove(9) form. The reason is to prevent the power of the operating actuator from being transmitted to the brake pedal(10).

The operation of the actuator in FIG. 3 is as follows. First, when electric power is supplied, the electromagnets(3,4) attract each other and bonds. The degree of power needed for such bonding is equivalent or lesser than the usual brake pedal pressure(about 10~15 Kgf) needed to stop the vehicle. This power pushes the push rod connecting shaft(6) through the electromagnet shaft(5) conjoined to the driving electromagnet(4) and the uneven groove(9). The push rod connecting shaft(6) and the conjoined push rod(8) push the booster(D) as illustrated in FIG. 3-(II), and the increased power in the booster is transmitted to the master cylinder which creates high hydraulic pressure. Then the high hydraulic pressure is sent to the objected brake line with its hydraulic pressure cutoff device turned off, and one wheel is braked. When the operator cuts off the switch(a1~a4) or cuts off power by pressing the brake pedal, the electromagnets lose their attractive force, the return spring(7) is operated to retrieve the power and call off the one wheel brake system to return to the normal locomotive state. FIG. 3-(III) is the structural view of the actuator when the operator is pressing the brake pedal while driving.

Instead of using the attractive force between the electromagnets as mentioned above, the repulsive force between the electromagnet as in FIG. 4 can be used to operate the actuator(C). The electromagnets (3',4'), which are normally attracted to one another by the return spring's(7) energy, begin to repulse others with the same magnetic pole. The repulsive force between the electromagnets then pushes the electromagnet shaft(5). The operation and effect of the above procedure is identical to that of using the electromagnets attractive force and to that of the electromagnets' losing attractive force.

Also the actuator can be operated by using an electromotor(G) which converts the electric power into mechanical power and produces needed power. The reason an electromotor is used is because it has several merits: it has a big output power; it maintains physically stabled force(it maintains low rotating velocity while it has high rotating power with heavy load, and it maintains high rotating velocity while it has low rotating power with light load) which enables to use space effectively. The electromotor(G) is composed of the electromagnet coil, shaft, steel lead, commutator, but this will skip the normal structure. FIG. 5-(I) is the structural view of the electromagnet, and (II) is the view of working. As power is supplied through the fixed contact point and OR5, the electromotor is rotated. The rotating force then rotates the pinion(12) which is attached to the front of the armature shaft(11), and pushes the rack(13) which then pushes the piston(14), which is fixated to the rack itself, forward. The structure and effect from the piston shaft(15) are same as the illustration of the electromagnets' (in FIGS. 3 and 4). Of course this procedure can be shortened by skipping the piston(4) and operating the uneven groove(9) directly by the pushing force of the rake(13).

Next is the operation of the actuator by using the hydraulic pressure generated by pressuring the auxiliary fluid tank using the power from the electromagnets or the electromotor. The hydraulic pressure type has a demerit of a double structure, but it has a merit of being free from equipment space restraint as the lengthened fluid line(18) enables the operation of the actuator far apart.

The hydraulic pressure type as can be seen in FIG. 6 inserts the compressed fluid, which is produced when the power from either the electromagnet(H) or the electromotor (G) pushes the first piston(17) of the auxiliary fluid tank(16), through the fluid line(18) to the auxiliary cylinder(19). The fluid with high pressure then pushes the second piston(14'), and the piston shaft(15) connected to the piston(14') pushes the push rod connecting shaft(6) to activate the brake pedal. The structure and effect from the push rod connecting shaft(6) is identical to the electromagnets'(in FIGS. 3 and 4).

However, the actuator need not be installed in front of the booster. It makes no difference whether the actuator is installed between the booster and the master cylinder fluid discharge pipe or on any brake line. Nevertheless, since the high hydraulic pressure brake requires actuators with large power capacity, these cases would call for more battery consumption because of the increased weight of the vehicle.

Also if the actuator is installed at the master cylinder fluid discharge pipe or on any brake line, a different circuit is needed from the one in FIG. 1 which will be explained later.

Next is of the operation of the hydraulic pressure cutoff devices (A1~A4) generated by the supplied power. FIG. 7-(I) is the front section view of the hydraulic pressure cutoff device before operation, and (II) is the view during operation. FIG. 8 is the side section view of the hydraulic pressure cutoff device, and (I) is before operation and (II) is during operation. The hydraulic pressure cutoff device is basically composed of the fixed electromagnet(20), the driving electromagnet(21), the electromagnet shaft(25) attached to the driving electromagnet, the reflux-block-bar(23) attached to the electromagnet shaft, the valve seat(24) which cuts off the hydraulic pressure and is adhered to the electromagnet shaft, the return spring(22) which opens the hydraulic pressure when power is cut off, and the shift passage(26) which allows the electromagnet free movement in the fluid line(27) while the driving electromagnet is in motion. The operation of the device is as follows.

The high hydraulic pressure created in the master cylinder by the operation of the actuator, which is generated by the electric power transmitted through OR gate(OR5) supplies hydraulic pressure to each brake line. However, the hydraulic pressure opened to all four lines is restricted to OR gate(OR2~OR4) as a1 is selected. Consequently, the hydraulic devices(A2~A4) are activated. As the electric power is supplied to the hydraulic pressure cutoff devices, the magnet-turned driving electromagnet(21) and the fixed electromagnet(20) attract each other. Therefore, the electromagnet shaft(25) descends along the shift passage(26) and the reflux-block-bar(23) bonds with the valve seat(24) to close the fluid line(27). The hydraulic pressure is supplied to each brake line except the lines(A2~A4) closed by the hydraulic pressure cutoff device which is in fact supplied solely to the selected line(A1) and one wheel is braked as purposed. When the electric power is cut off and the hydraulic pressure is relieved, the electromagnets lose their attractive force, and the reflux-block-bar(23) ascends by the elasticity of the return spring(46) opening the fluid line(27).

FIGS. 9 and 10 are the diagram of using the repulsive force between the electromagnets instead of the attractive force, and (I) is before operation and (II) is during operation. When electric power is supplied to the hydraulic pressure cutoff device the magnet-turned driving electromagnet(21') and fixed electromagnet repulse each other and are separated. Hence, the electromagnet shaft descends along the shift passage(26), and the reflux-block-bar(23) bonds with the valve seat(24) which then close the fluid line(27). The operation and effect following the closure of the fluid line of the repulsive force type is identical to that of the attractive force type.

FIG. 11 is of the hydraulic pressure cutoff device using the electromotor(G), and (I) is the structural view before operation and (II) during operation. When electric power is supplied to the hydraulic pressure cutoff device, power is supplied to rotate the electromotor. The rotating force then rotates the pinion(29) attached to the front of the electromagnet shaft(28), rears the rack(30), and descends the reflux-block-bar(23) adhered to the rack which bonds with the valve seat(24) to close the fluid line(27). Its operation and effect is the same as the electromagnet's type. When electricity is cut off, the hydraulic pressure is relieved, the electromotor stops rotating, and the return spring(31) ascends the reflux-block-bar(23) by its elasticity to open the fluid line.

Another form of the hydraulic pressure cutoff device is of injecting fluid. The fluid injection type has a demerit of a double structure, but it also has many merits: it is easy to replace individual parts, and it is controllable from far apart. FIG. 12 is the structural view of the hydraulic pressure cutoff device of fluid injection type, and (I) is the view before operation and (II) is the view during operation. The power is supplied to the hydraulic pressure cutoff device by the electromagnet(H) or electromotor(G), and the operation of the device is as follows.

First, as the power source supplies power, the power generated from the electromagnets(H) or the electromotor (G) pushes the first piston(33) in the auxiliary fluid tank(21) to create hydraulic pressure. The compressed fluid is injected to the auxiliary cylinder(35) through the fluid line(34). The fluid with high hydraulic pressure then pushes the second piston(36), and the attached reflux-block-bar(23) descends to bond with the valve seat(24) to close the fluid line(27). As power is cut off, in other word as one wheel is braked and it is ready for normal driving, the electromagnets and the electromotor lose their power. Therefore, the pressure in the auxiliary cylinder(35) is relieved by the return spring(31), and the reflux-block-bar(23) ascends to open the fluid line to allow normal driving condition.

FIG. 13 shows another method, the fluid inhalation type, to the close the brake lines: instead of compressing the fluid through the first piston(33'), the pressure in the fluid tank(21) can be sent down to inhale the fluid in the auxiliary cylinder (35) and descend the second piston(36') and the reflux-block-bar(23) to close the fluid line. (I) is the structural view of the fluid inhalation type, and (II) is the view of operation; the basic operation and effect is no different from the above fluid injection type. The operation is as follows: the power generated by the electromagnets(H) or the electromotor(G) reverts the movement of the first piston(33') which results in an instant drop of the hydraulic pressure in the fluid tank(32) due to increased volume; the fluid tank then inhales the fluid from the auxiliary cylinder(25). When the volume of the tank decreases by fluid ejection, the second piston(36') descends the reflux-block-bar(23) which in turn adheres to the valve seat(24) to close the fluid line. As power is cut off, the line is opened by the elasticity of the return spring(31) and allows normal driving condition.

All the types of hydraulic pressure cutoff devices mentioned above achieves the object of one wheel braking with small power; the devices are closed by the adhered valve seat and reflux-block-bar, and are further closed by the high hydraulic pressure created in the master cylinder, so a quick operation enables to brake one wheel with small power. Also it makes no difference installing the hydraulic pressure cutoff device on the top or middle of the valve seat. However, if the device is installed on the top, in order to close the fluid line, the reflux-block-bar should be pushed down from above rather than being pulled up from underneath.

Automatic transmission vehicles has the substitute brake switch contact point for manual stick vehicles' stop lamp contact point. The operator of an automatic transmission vehicle can drive with operator's foot on the brake pedal while operator is driving a short distance at low speed because the vehicle is run by basic engine RPM. In this case, the one wheel brake system does not operate because electric power is naturally supplied to the stop lamp contact point and high electric power is only supplied to FIG. 1's OR6. The electric power does not reach OR1~OR5, so the one wheel brake system cannot be operated. Therefore, during on basic engine RPM, the operator should make sure the one wheel brake system operates under half braking state with residual pressure enough to halt movement of the vehicle, and only by pressing the accelerator should the vehicle move. In order to establish this state, before the brake if fully stepped off, or at half braking state, the actuator(C) and the hydraulic pressure cutoff devices (A1~A4) should be put into operation. During the vehicle is on D or R of the shift gear, the one wheel chosen by the operator for the one wheel brake system should be fully braked while the other wheels are maintained at half braking state even at 1300~1500 engine RPM. This condition should be met to enable the operator to step operator's foot off the brake pedal to step on the accelerator to brake one wheel. Then the driving force overcome the half braking force of the three wheels to move the vehicle and achieve the object of the one wheel braking system. The reason why the brake's braking force has to overcome the 1300~1500 engine RPM driving force during D or R of the shift gear is because it takes that much driving force for the engine to reach its normal driving condition from its initial ignition from the cool state.

FIGS. 14 and 15 are the structural view of the brake switch contact point which is installed in the automatic transmission vehicle in place of the stop lamp contact point(1); FIG. 14 is a snap type, and FIG. 15 is a hydraulic pressure type. The operation of the snap type is as follows. A requisite of the snap type is equipping the variable regulator nut(40) and varying the gap of the contact point which is for the vehicle to maintain the half braking state under 1300~1500 engine RPM or below while the operator has operator's foot off the brake pedal(10) during the operation of the one wheel brake system. When the operator steps on the accelerator and the driving force exceeds that of 1300~1500 engine RPM, the half braking state is broken and the vehicle moves according to the one wheel brake system. As the operator tries to stop the car after one wheel is braked and steps on the brake pedal more than the residual pressure of the half braking state, the contact point(38) joins with the plunger(37), and high electric power is supplied to OR6 attached to the terminals(41) to stop the one wheel brake system and start the foot brake lines. (39) is the switch spring, and (42) is the brake pedal return spring.

The hydraulic pressure type of FIG. 15 increases the residual force of the return spring(45) to maintain the half braking state under below 1300~1500 engine RPM of driving force without the operator's foot on the brake pedal and increase the spring's elasticity to prevent the contact point (44) and the terminals(46) to bond. Nevertheless, when the brake pedal pressure increases and the increased hydraulic pressure in the master cylinder(43) exceeds that of the spring's elasticity, the contact point and the terminals bond to supply high electric power to OR6 and stop the one wheel brake system and start the foot brake lines.

Next, the case in which the actuator is placed on the master cylinder fluid discharge pipe where each wheels are divided is illustrated. The normally used tandem master cylinder has two pressure chambers, primary chamber and secondary chamber, and two independent fluid lines; therefore, in order to achieve the object of the one wheel brake system, two actuators and an electric circuit different from the one in FIG. 1 are required. Also as the generated hydraulic pressure should not flow into the master cylinder, the structure of the actuator is altered. FIG. 16 is the view of the altered circuit, and FIG. 17 is the structural view of the actuator.

First, lets look at the circuit in FIG. 16. The circuit from the power source to the AND gate is identical to the one in FIG. 1. One of the power source is supplied to the OR gate(OR7) after the operator chooses a select switch fixed contact point(a1 of a1~a4) and activates the actuator(C). The hydraulic pressure created in the actuator is sent to A1 and A2 brake lines. Meanwhile the other power source which a1 supplied starts the hydraulic pressure cutoff device of A2 which cuts the hydraulic pressure sent to the A2 brake line. Consequently, the hydraulic pressure is sent solely to A1 brake line, and the object of the one wheel brake system is achieved. As the operator turns the fixed contact point switch off, the one wheel brake system stops its operation completely. On the other hand, if the operator chooses a5 to replace the hand brake, electric power is supplied only to OR7 and OR8, and A1~A4 hydraulic pressure cutoff devices do not receive any power which in effect brings full brake to all wheels. Of course the circuit can be connected to only one of either OR7 or OR8 and operate one actuator to reduce battery consumption while producing same effect.

The structure of the actuator in FIG. 17 is as follows. (I) is the structural view, and (II) is the view during operation. The power generator of the actuator can be either the electromagnets(H) or the electromotor(G). The electromagnets or the electromotor which has electric power supplied through OR gate compresses the first piston(52) and creates high hydraulic pressure in the fluid tank. The hydraulic pressure is then sent to the auxiliary cylinder(48) through the fluid line(54), and lifts the reflux-block-bar(47) to attach it with the valve seat(24) and prevent the hydraulic pressure from entering the master cylinder. Also the hydraulic pressure in the cylinder pushes the second piston(49) up to the hydraulic pressure limit point of full braking, and is sent to the wheel cylinder or the caliper cylinder to achieve the object of one wheel brake system. As the one brake system is cancelled, the return spring(50) instantly recalls the pressure and normal driving condition is achieved. The piston stop bolt(51) prevents the actuator from being affected by high hydraulic pressure created when the operator steps on the brake pedal during normal driving conditions.

Finally, a method to equip the actuator at each brake line is illustrated. The actuator should have the same structure as the one in FIG. 17, but since hydraulic pressure is created in independently chosen brake line, the hydraulic pressure cutoff device is unnecessary. FIG. 18 is the circuit drawing which is identical from the power source to the AND gate to the ones in FIGS. 1 and 16. The difference is when a1~a4 switches are chosen, electric power is sent through the OR gate(OR1~OR4) to the actuator(C1~C4) in which hydraulic pressure is created to directly brake the wheels. In addition, if the operator chooses a5 to replace the hand brake, electric power is sent to OR1~OR4 and all wheels can be fully braked. Of course in this case the circuit can be connected to only two of either the front wheels or the rear wheels to reduce battery consumption while producing same effect.

The one wheel brake system mentioned above constrains the rotating force of a chosen wheel among four wheels. The other wheels according to characteristics of the differential gear device draws a circle with the braked wheel as their pivot. Of course according to the principle of the Ackerman-Jeantaud, the wheels which cannot catch up with the ratio of the rotation slips and draws a circle.

What is claimed is:

1. A one-wheel brake system for a vehicle comprising:
   a brake pedal;
   a booster for boosting a brake force transmitted from the brake pedal via a push rod;
   a master cylinder for receiving the boosted brake force from the booster, thereby generating a hydraulic brake pressure; and
   a brake unit for selectively transmitting the hydraulic brake pressure generated from the master cylinder to at least one wheel of the vehicle via a brake fluid line, so that the at least one wheel of the vehicle is braked, wherein the brake unit comprises:
      an actuator for operating the push rod upon receiving power;
      fluid line cut-off units each adapted to cut off a brake fluid line directly connected to an associated one of the wheels upon receiving power; and
      an electronic circuit for controlling supply of the power to the fluid line cut-off units and the actuator.

2. The one-wheel brake system according to claim 1, wherein:
   the actuator is configured to operate the push rod using an attraction or repulsion between electromagnets, or power from a motor; and
   the push rod serves to cut off a brake force from the brake pedal when it operates.

3. The one-wheel brake system according to claim 1, wherein the actuator comprises:
   a pinion mounted to an output shaft extending from the motor to rotate in accordance with the power from the motor;
   a rack engaged with the pinion to move in accordance with the rotation of the pinion; and
   a piston connected to the rack to move in accordance with the movement of the rack, and provided with a piston shaft connected to the push rod, so that the push rod is operated in accordance with the movement of the piston.

4. The one-wheel brake system according to claim 2, wherein the actuator comprises:
   an oil tank having a first piston movable in accordance with the attraction or repulsion between the electromagnets or the power from the motor to supply a compressed oil; and
   an assistant cylinder in communication with the oil tank via an oil pipe to receive the compressed oil from the oil tank, the assistant cylinder having a second piston provided with a piston shaft connected to the push rod, and adapted to move by the compressed oil supplied into the assistant cylinder, thereby operating the push rod.

5. The one-wheel brake system according to claim 1, wherein each of the fluid line cut-off units cuts off the associated brake fluid line using an attraction or repulsion between electromagnets, or power from a motor.

6. The one-wheel brake system according to claim 5, wherein each of the fluid line cut-off units comprise:
   a pinion mounted to an output shaft extending from the motor to rotate in accordance with the power from the motor;
   a rack engaged with the pinion to move in accordance with the rotation of the pinion; and
   a valve member connected to the rack to move in accordance with the movement of the rack, thereby cutting off the associated brake fluid line.

7. The one-wheel brake system according to claim 5, wherein each of the fluid line cut-off units comprise:
   an oil tank having a first piston movable to supply a compressed oil;

an assistant cylinder in communication with the oil tank via an oil pipe to receive the compressed oil from the oil tank, the assistant cylinder having a second piston provided with a piston shaft connected to the push rod, and adapted to move by the compressed oil supplied into the assistant cylinder; and a valve member connected to the piston shaft of the second piston to move in accordance with the movement of the piston shaft, thereby cutting off the associated brake fluid line.

8. The one-wheel brake system according to claim 1, wherein the electronic circuit has a select switch for selecting a desired one of the wheels in accordance with a manipulation thereof by a driver of the vehicle, so that it operates the actuator in accordance with an input signal from the select switch while operating the fluid line cut-off units, except for the fluid line cut-off unit corresponding to the selected wheel to be braked, thereby braking only the selected wheel, or operates only the actuator, thereby braking all the wheels.

9. The one-wheel brake system according to claim 1, wherein the electronic circuit is adapted to use, as an input signal thereof, a signal outputted from a brake lamp contact switched on when a brake lamp turns on, so that it cuts off supply of the power of the actuator and the fluid line cut-off units, thereby causing only a main braking function to be performed.

10. The one-wheel brake system according to claim 1, wherein the electronic circuit is adapted to use, as an input signal thereof, a signal outputted from a speed sensor contact switched on when the vehicle runs at a speed not lower than a predetermined speed, thereby causing a one-wheel braking function to be performed only when the speed of the run is lower than the predetermined speed.

11. The one-wheel brake system according to claim 1, wherein the electronic circuit performs a one-wheel braking function when the vehicle is in a semi-braking state in which the vehicles runs within a predetermined RPM range; and the electronic circuit cuts off supply of the power of the actuator and the fluid line cut-off units when the vehicle runs below the predetermined RPM range, thereby causing only a main braking function to be performed.

12. A one-wheel brake system for a vehicle comprising:

a brake pedal;

a booster for boosting a brake force transmitted from the brake pedal via a push rod;

a master cylinder for receiving the boosted brake force from the booster, thereby generating a hydraulic brake pressure; and a brake unit for selectively transmitting the hydraulic brake pressure generated from the master cylinder to at least one wheel of the vehicle via a brake fluid line, so that the at least one wheel of the vehicle is braked, wherein:

the brake fluid line comprises a first brake fluid line branched out from an oil outlet of the master cylinder, and second brake fluid lines each branched out from a downstream end of the first brake fluid line and directly connected to an associated one of the wheels; and the brake unit comprises:

a pair of actuators for generating a hydraulic brake pressure in the first brake fluid line upon receiving a power, and transmitting the generated hydraulic brake pressure only to the second brake fluid lines, fluid line cut-off units each adapted to cut off an associated one of the second brake fluid lines upon receiving power; and an electronic circuit for controlling supply of the power to the fluid line cut-off units and the actuators.

13. The one-wheel brake system according to claim 12, wherein the electronic circuit has a select switch for selecting a desired one of the wheels in accordance with a manipulation thereof by a driver of the vehicle, so that it operates a selected one of the actuators in accordance with an input signal from the select switch while operating the fluid line cut-off units, except for the fluid line cut-off unit corresponding to the selected wheel to be braked, thereby braking only the selected wheel, or operates only the actuators, thereby braking all the wheels.

* * * * *